United States Patent

Bauer et al.

[11] 4,033,945
[45] July 5, 1977

[54] WATER-SOLUBLE TRISAZO 8-AMINO-NAPHTHOL-1 DYES

[75] Inventors: Wolfgang Bauer, Maintal; Erwin Krusche, Frankfurt am Main; Joachim Ribka, Offenbach am Main-Burgel, all of Germany

[73] Assignee: Cassella Farbwerke Mainkur Aktiengesellschaft, Germany

[22] Filed: May 20, 1975

[21] Appl. No.: 579,156

[30] Foreign Application Priority Data

May 20, 1974 Germany .................... 2424462

[52] U.S. Cl. .................. 260/157; 260/155; 260/156; 260/158; 160/160; 260/198; 260/305; 260/307 D; 260/309.2

[51] Int. Cl.[2] .............. C09B 31/16; C09B 33/18; C09B 35/36; D06P 1/06

[58] Field of Search ......... 260/152, 157, 158, 155, 260/156, 160

[56] References Cited

UNITED STATES PATENTS

| | | | |
|---|---|---|---|
| 515,339 | 2/1894 | Israel et al. | 260/158 |
| 1,667,327 | 4/1928 | Mayer et al. | 260/158 |
| 1,749,513 | 5/1930 | Schweitzer | 260/157 X |
| 2,112,405 | 3/1938 | Mayer et al. | 260/158 |
| 2,831,848 | 4/1958 | Riat et al. | 260/158 X |
| 2,870,135 | 1/1959 | Senn | 260/159 X |
| 3,179,650 | 4/1965 | Wehrli et al. | 260/158 |
| 3,519,615 | 7/1970 | Wolfrum et al. | 260/155 |

Primary Examiner—Floyd D. Higel
Attorney, Agent, or Firm—Connolly and Hutz

[57] ABSTRACT

Very effective direct dyeing of cotton and other hydroxyl- or nitrogen-containing fibers is effected with water-soluble triasazo dyes having the formula:

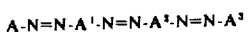

where A is a radical of a diazoconstituent and $A^3$ is a radical of a coupling constituent

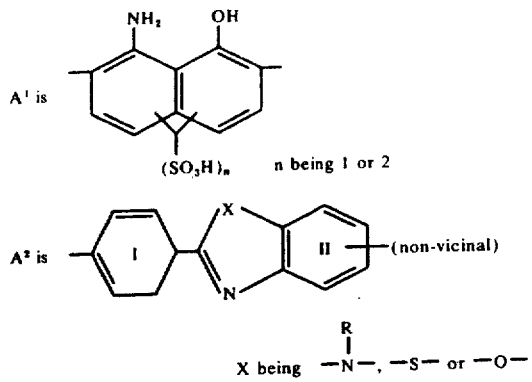

and $A^1$ or $A^2$ or both can have their azo linkages reversed. These dyes are very fast particularly to washing and to perspiration, and are so effective with cotton that dye baths for such use are rapidly exhausted and the disposal of used bath is less of a problem.

20 Claims, No Drawings

WATER-SOLUBLE TRISAZO 8-AMINO-NAPHTHOL-1 DYES

The present invention relates to trisazo dyes, and particularly to such dyes as are water-soluble and suitable for direct dyeing of cotton and other fibers.

Among the objects of the present invention is the provision of novel dyes of the foregoing type which are easily made and very effectively used.

The foregoing as well as additional object of the present invention will be more fully considered in the following description of several of its exemplifications.

According to the present invention the direct dyeing of cotton and other hydroxy- or nitrogen-containing fibers is very effectively carried out with a water-soluble trisazo dye having an 8-amino-naphthol-1-nucleus with not more than two sulfo groups, and linked at its 2 and 7 positions by separate azo bridges to the remainder of the dye molecule, one link being to a carbon on an aromatic nucleus of a radical of a diazo constituent, and the other link being to the heterocyclic group

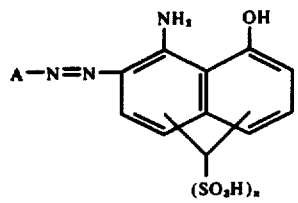

which in turn is linked by a third diazo bridge to a carbon on a cyclic nucleus of a radical of a coupling constituent, the linkages to the heterocyclic group being at the specified open bonds, the right-hand bond of which is in non-vicinal position with respect to the azole ring, X representing

—S— —O— where R is hydrogen or lower hydrocarbyl free of non-aromatic unsaturation. Such hydrocarbyl groups can contain up to eight carbons and can be purely alkyl, cyclic or acyclic, purely aryl, or mixed.

The trisazo dyes of the present invention color cotton black, blue or green, primarily, and do so with such effectiveness that a simple direct dye solution used in this way gives up nearly all its dye to the cotton, leaving the exhausted solution only weakly colored. This reduces clean-up and disposal problems. At the same time the dye on dyed cotton is very fast, particularly to washing and to perspiration.

In the foregoing respects the dyes of the present invention are superior to prior art dyes as Diamine Green B (Colour Index 593) and Erie Direct Black (Colour Index 481), both of which have trisazo structures including 1-hydroxy-8-naphthol-disulfonic acid, but do not contain the 2-phenyl benzazole group of the present invention.

The dyes of the present invention are readily prepared by the usual type of diazotization and azo coupling reactions. Thus where the final dye is represented as $$A-N=N-A^1-N=N-A^2-N=N-A^3 \quad \text{I}$$

A is a radical of a diazo constituent and $A^3$ is a radical of a coupling constituent, A-NH$_2$ is diazotized and coupled with a 1-amino-8-hydroxynaphthalene sulfonic acid to produce a monoazo dye which in the form of the free acid has the formula

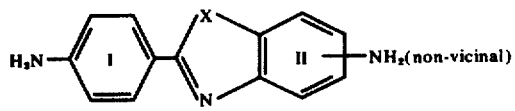

where $n$ is 1 or 2

Then the heterocyclic diamine

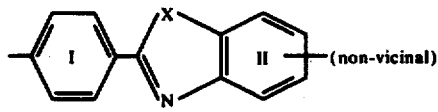

is tetrazotized and unilaterally couples with the monoazo dye to produce the bisazo diazonium intermediate

wherein Y$^-$ stands for an anion preferably an anion of a mineral acid, e.g. hydrochloric acid or sulfuric acid. This intermediate is then coupled with A$^3$—H.

The diazotization and tetrazotization are carried out in any desired manner such as those used in prior art azo dye production. The couplings take place readily in an aqueous medium, which may also contain water-soluble organic solvents such as alcohol, at temperatures of $-10°$ to $+30°$ C, and preferably at $0°$ to $20°$ C. The coupling of the diazotized A-NH$^2$ constituent with the 1-amino-8-hydroxynaphthalene sulfonic acid is carried out in an acid pH range, preferably at pH values of 1 to 3. The unilateral coupling of the tetrazotized heterocyclic diamine with the monoazo dye is desirable carried out at weakly acid or alkaline pH values, preferably at pH values of 4 to 12. The final coupling is desirably effected under somewhat more alkaline conditions at a pH from about 6 to about 12, preferably about 8 to 10.

In the coupling reactions, the reaction partners are joined in a molar ratio of 1:1, and they can be mixed in that proportion. It is helpful to carry out the couplings in the presence of coupling accelerators such as pyridine or urea, for example.

The trisazo dye of the present invention may also be prepared by first tetrazotizing the heterocyclic diamine, coupling it unilaterally with A$^3$—H, subsequently coupling the monoazo dyestuff thus formed with the monoazo dye of Formula II for example. These couplings are desirable effected in an aqueous medium at pH values of about 5 to about 10, and preferably about 7 to about 9. In the aqueous coupling media there may be optionally present water-miscible organic solvents, such as alcohols for example, as well as coupling accelerators, such as those referred to above.

Suitable diazo constituents A-NH$_2$ are, for example

Aniline
2-,3- and 4-methylaniline
2,5- and 2,4-dimethylaniline
2- and 4-methoxyaniline
2- and 4-ethoxyaniline
2-methyl-5-methoxyaniline
4-chloro-2-methylaniline
5-chloro-2-methylaniline
2,3-, 2,4- and 2,5-dichloroaniline
2-chloro-4-nitroaniline
2-methyl-5-nitroaniline
2-nitro-4-methylaniline
4-aminobenzoic acid
4-aminobenzoic acid amide
4-aminobenzene-1,3-disulfonic acid
2-amino-5-nitrobenzene sulfonic acid
4-nitro-4'-aminodiphenylamine-2-sulfonic acid
4-aminobenzene sulfonic acid amide
1-aminonaphthalene
1-aminonaphthalene-4-sulfonic acid
1-aminonaphthalene-3,6-disulfonic acid
2-aminonaphthalene-5-sulfonic acid
2-aminonaphthalene-3,6-disulfonic acid
dehydrothiotoluidine
2-aminobenzothiazole Particularly suitable are 2-, 3- and 4-chloroaniline
2-chloro-4-nitroaniline
2,5-dichloroaniline
2,4,5-trichloroaniline
2-, 3- and 4-nitroaniline
2-, 3- and 4-aminobenzene sulfonic acid
dehydrothiotoluidine sulfonic acid
2-aminobenzothiazole Suitable 1-amino-8-hydroxynaphthalene sulfonic acids are, for example:

1-amino-8-hydroxynaphthalene-3,6-disulfonic acid
1-amino-8-hydroxynaphthalene-4,6-disulfonic acid
1-amino-8-hydroxynaphthalene-4-sulfonic acid.

In the heterocyclic diamine, the amino group in nucleus II may be in the 5 or 6 position of the benzazole system. This is indicated by the "non-vicinal" legend. Suitable heterocyclic diamines are, for example:

2-(4'-aminophenyl)-5 (or 6)-aminobenzimidazole
1-methyl-2-(4'-aminophenyl)-6-aminobenzimidazole
1-methyl-2-(4'-aminophenyl)-5-aminobenzimidazole
1-ethyl-2-(4'-aminophenyl)-5-aminobenzimidazole
1-propyl-2-(4'-aminophenyl)-5-aminobenzimidazole
1-butyl-2-(4'-aminophenyl)-5-amino-benzimidazole
1-phenyl-2-(4'-aminophenyl)-5-amino-benzimidazole
1-benzyl-2-(4'-aminophenyl)-5-amino-benzamidazole
2-(4'-aminophenyl)-4-methyl-5-amino-benzimidazole(identical with 2-(4'-aminophenyl)-6-amino-7-methyl-benzimidazole)
2-(4'-aminophenyl)-5-amino-6-methyl-benzimidazole (identical with 2-(4'-aminophenyl)-5-methyl-6-amino-benzimidazole)
2-(4'-aminophenyl)-5- amino-6-chlor-benzimidazole (identical with 2-(4'-aminophenyl)-5-chlor-6-amino-benzimidazole)
2-(4'-aminophenyl)-5-amino-7-chlor-benzimidazole (identical with 2-(4'-aminophenyl)-4-chlor-6-amino-benzimidazole)
2-(4'-aminophenyl)-5-amino-6-ethoxy-benzimidazole (identical with 2-(4'-aminophenyl)-5-ethoxy-6-amino-benzimidazole)
2-(2'-methyl-4'-aminophenyl)-5- (or 6)-amino-benzimidazole
2-(3'-methyl-4'-aminophenyl)-5- (or 6)-amino-benzimidazole
2-(2'-chlor-4'-aminophenyl)-5- (or 6)-amino-benzimidazole
2-(3'-chlor-4'-aminophenyl)-5- (or 6)-amino-benzimidazole
2-(4'-aminophenyl)-5-amino-benzoxazole
2-(4'-aminophenyl)-6-amino-benzoxazole
2-(4'-amino-2'-chlor-phenyl)-5-amino-benzoxazole
2-(4'-aminophenyl)-4-methyl-5-amino-benzoxazole
2-(4'-aminophenyl)-5-amino-benzthiazole
2-(4'-aminophenyl)-6-amino-benzthiazole
2-(4'-aminophenyl)-6-methyl-5-amino-benzthiazole
2-(4'-aminophenyl)-5-methyl-6-amino-benzthiazole
2-(4'-aminophenyl)-5-chlor-6-amino-benzthiazole In the benzimidazoles a tautomeric relationship exists so that a distinction cannot be made between the 5 and the 6 position, for example where the molecules are otherwise symmetrical with respect to those positions. In the event that further substituents are present in nucleus II, the tautomers have different numbering, as noted above.

To the extent the heterocyclic diamines are not already described in the literature, they may be prepared in accordance with various known processes. The benzimidazoles

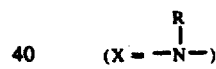

and benzoxazoles (X = —O—) may be prepared, for example, by reacting unsubstituted or suitably substituted p-nitrobenzoic acid with unsubstituted or suitably substituted aniline or phenol, to produce an intermediate anilide or ester of Formula III where $X^1$ is

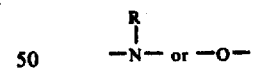

and nuclei I and II may be further substituted.

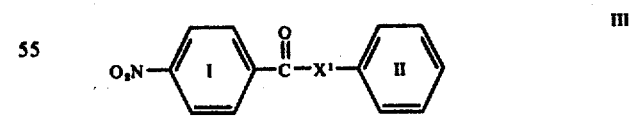

III

This intermediate is nitrated, the trinitro compound of Formula IV being obtained:

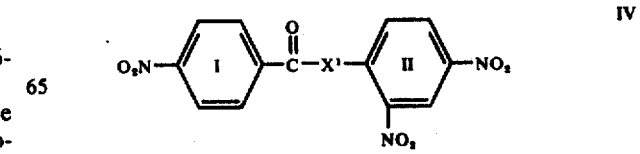

IV

By the reduction of the three nitro groups and cyclizing condensation, the desired diamines of Formula

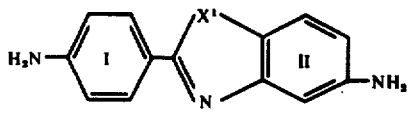

are formed. The preceding reaction sequence is disclosed in German Patent 70,862 and in papers by O. Kym in Ber. dtsch. chem. Ges. 32, 1427–1432 and 2178–2180 (1899).

Suitable nitrobenzoic acids are, for example:

4-nitrobenzoic acid
2-chloro-4-nitrobenzoic acid
3-chloro-4-nitrobenzoic acid
2-bromo-4-nitrobenzoic acid
3-bromo-4-nitrobenzoic acid
2-methyl-4-nitrobenzoic acid
3-methyl-4-nitrobenzoic acid Suitable anilines and phenols for the foregoing sequence are unsubstituted or substituted, but substitutions in the benzene ring should be confined to the 2, 3 and 5 positions, e.g.:

Aniline
2-methylaniline
3-methylaniline
2-methoxyaniline
2-methyl-5-methoxyaniline
2,5-dimethoxyaniline
2-chloroaniline
3-chloroaniline
5-chloro-2-methylaniline
N-methylaniline
N-ethylaniline
N-propylaniline
N-butylaniline
N-benzyl-2-chloroaniline
phenol
2-methylphenol
3-methoxyphenol
3-chlorophenol Substituents may be introduced into any free position on ring II of the heterocyclic diamine.

By modifying the foregoing sequence so as to start with the benzoic acid chloride rather than the free benzoic acid, and reacting it with a 2,4- or 2,5-dinitroaniline or a corresponding dinitrophenol or dinitrothiophenol, the sequence can be extended to prepare the benzthiazole type as well as the benzimidazole and benzoxazole types of heterocyclic diamine intermediate. In this modified sequence the nitration step preceding the reduction and cyclizing is omitted. This modified method of preparation is described, for example in O. Kym, Ber. dtsch. chem. Ges. 32, 1427–1432 (1899) and Chem. Abstr. 52, 17240 (1958) (B.A. Porai-Koshits and Ch. Frankowskii, Zhur. Obshchei Khim (Journ. Gen. Chem) 28, 928 (1958).

Suitable benzoic acid chlorides for the modified sequence are, for example:

4-nitro-benzoic acid chloride
2-chloro-4-nitro-benzoic acid chloride
3-chloro-4-nitro-benzoic acid chloride
2-bromo-4-nitro-benzoic acid chloride
3-bromo-4-nitro-benzoic acid chloride
2-methyl-4-nitro-benzoic acid chloride
3-methyl-4-nitro-benzoic acid chloride Suitable dinitro compounds for the modified sequence are, for example:

2,4-dinitroaniline
N-methyl-2,4-dinitroaniline
N-phenyl-2,4-dinitroaniline
5-chloro-2,4-dinitroaniline
5-bromo-2,4-dinitroaniline
N-phenyl-5-chloro-2,4-dinitroaniline
6-chloro-2,4-dinitroaniline
5,6-dichloro-2,4-dinitroaniline
2,5-dinitroaniline
N-methyl-2,5-dinitroaniline
N-propyl-2,5-dinitroaniline
4-chloro-2,5-dinitroaniline
4-bromo-2,5-dinitroaniline
6-chloro-2,5-dinitroaniline
N-phenyl-4-bromo-2,5-dinitroaniline
2,4-dinitrophenol
3-chloro-2,4-dinitrophenol
5-chloro-2,4-dinitrophenol
6-chloro-2,4-dinitrophenol
2,5-dinitrophenol
4-chloro-2,5-dinitrophenol
4,6-dinitro-3-hydroxytoluene
2,5-dinitro-4-hydroxytoluene
2,4-dinitrothiophenol The 5-amino isomers of the heterocyclic diamine intermediates may also be obtained by reacting unsubstituted or suitably substituted p-aminobenzoic acid with unsubstituted or suitably substituted 2,4-diamino derivatives of aniline, phenol or thiophenol, in the presence of polyphosphoric acid. The following reaction takes place:

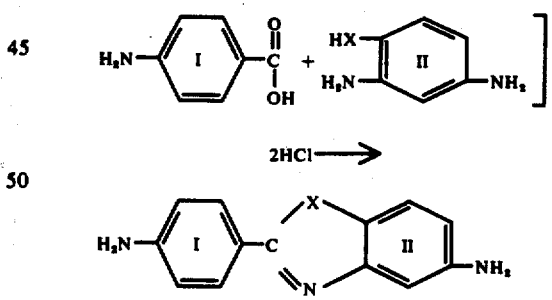

See. J. Preston, W. DeWinter and W. L. Hofferberth, Jr., W. Heterocycl. Chem. 1969, 6 (1), 119, as well as M. T. Bogert and M. G. Sevag, J. Am. Chem. Soc. 53, 660 (1931); F. F. Stephens and D. G. Wibberley, J. Chem. Soc. 1950, 3336; M. T. Bogert and W. S. Taylor, Collection Czechoslow, Chem. Comm. 3, 480 (1931).

The heterocyclic diamines may also be prepared in accordance with a further method, by reacting unsubstituted or suitable substituted 4- or 5-nitro derivatives of o-phenylene diamine, o-aminophenol or o-aminothiophenyl with unsubstituted or suitable substituted p-nitro benzoic acid chloride to thus effect cyclization and form a cyclized dinitro compound which is then reduced to the heterocyclic diamino compound. See Muttelet, Annales de Chimie et Physique (7) 14, 415; B. N. Feitelson, P. Mamalis, R. J. Monalim, V. Petrow, O. Stephenson and B. Sturgeon, J. Chem. Soc. 1952, 2389; Chem. Abstr. 67, 98987 b (1967); see also H. Hauser, Helv. Chim. Acta 11, 198 (1928) and French Patent 854,156.

The following are suitable as the 4- or 5-nitro compounds for the last-mentioned sequence:

4-nitro-1,2-diaminobenzene
$N^1$-phenyl-4-nitro-1,2-diaminobenzene
4-nitro-2-aminophenol
5-nitro-2-aminophenol
6-chloro-4-nitro-2-aminophenol
4-nitro-2-aminothiophenol
5-nitro-2-aminothiophenol Examples for suitable p-nitro-benzoic acid chlorides are the same as mentioned on page 10.

Both 5- and 6-amino isomers of the heterocyclic diamines are prepared by this sequence.

In the coupling of a tetrazotized heterocyclic diamine with the monoazo aminoaphtol intermediate dyes, the coupling takes place ortho to the hydroxy group of the naphthalene nucleus, but either diazonium group of the tetrazotized diamine can couple in this way. These two possibilities produce the following two structures for the final dye:

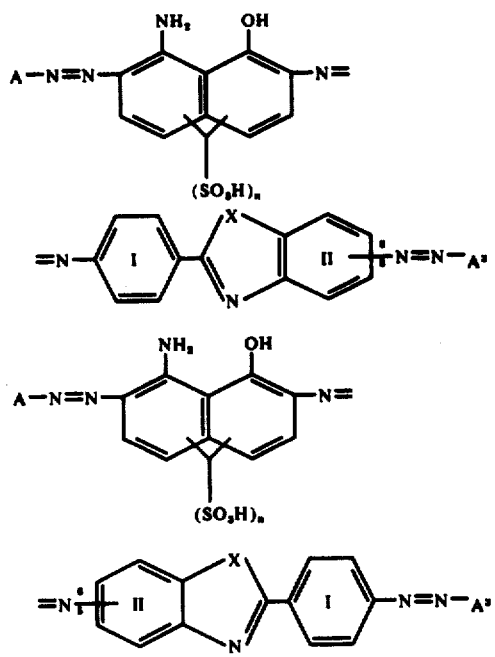

Ia

Ib

The trisazo dyes prepared in this manner are mixtures of both structures, although structure Ia may predominate.

Another process for preparing the trisazo dyes of the present invention is to first unilaterally couple the tetrazotized heterocyclic diamine with the aminonaphthol sulfonic acid in an acid pH-range, preferably at pH-values of 1 to 3 to yield a monoazo diazonium compound

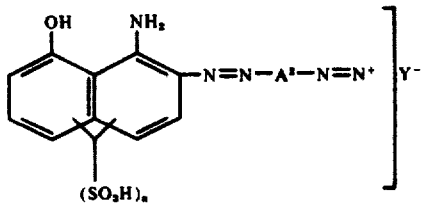

V diazotized $A-NH_2$ is then coupled to this compound at pH-values of 4 to 12 to form the disazo diazonium compound

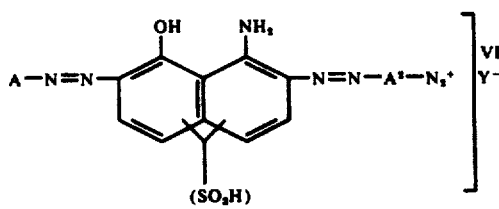

VI which is then coupled with $A^3$-H to form the desired trisazo dye. In this sequence the unilateral coupling of the tetrazotized diamine also takes place from both the diazonium groups so that a mixture of compounds is formed with their azo linkages interchanged as in compounds I (a) and I (b).

It is also possible to couple the monoazo diazonium compound V with the coupling constituent $A^3$-H at pH-values from 4 to 12, thus obtaining the disazo dyestuff

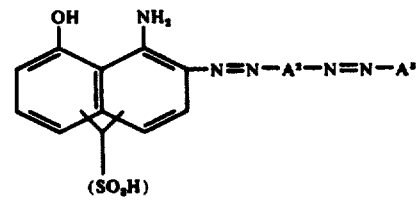

VII

Diazotized $A-NH_2$ is then coupled to this disazo dyestuff VII at pH-values from 4 to 12 in order to obtain a trisazo dyestuff of the present invention.

All of the couplings are desirable effected under the general and preferred conditions given above. It will be noted that coupling in the acid pH range, preferably at pH-values of 1 to 3 to the aminonaphthol sulfonic acid nucleus takes place at the position ortho to the amino group even though the position ortho to the hydroxy group is open.

Suitable coupling constituents $A^3$-H are, for example:

Phenol
2-methylphenol
4-methylphenol
3-chlorophenol
3-methoxyphenol
1,3-dyhydroxy-benzene
1-amino-3-hydroxy-benzene
1-amino-3-hydroxy-4-chlor-benzene
1-(2'-methyl-phenylamino)-3-hydroxy-benzene
1,3-diamino-benzene
1,3-diamino-4-methyl-benzene
1,3-diamino-4-chlor-benzene
1,3-diamino-4-nitro-benzene 1-amino-3-dimethylamino-benzene
1-acetylamino-3-diethylamino-benzene
1-amino-3-carboxymethylamino-benzene
1-amino-3-carboxyethylamino-benzene
1-amino-3-sulfomethylamino-benzene
1-amino-3-sulfoethylamino-benzene
1,3-diaminobenzene-4-sulfonic acid
2-hydroxy benzoic acid
3-hydroxy benzene sulfonic acid
2-hydroxy-naphthalene
2-hydroxy-naphthalene-3-carboxylic acid
2-hydroxy-naphthalene-6-sulfonic acid
2-amino-5-hydroxy-naphthalene-7-sulfonic acid
2-amino-8-hydroxy-naphthalene-6-sulfonic acid
1-phenyl-3-methyl-pyrazolone-(5)
2,4-dihydroxyquinoline
5-cyano-6-hydroxypyridone-(2)
acetoacetic acid anilide
4-methyl-5-cyano-6-hydroxypyridone-(2)

In the manufacture of the dyestuffs according to the invention, the starting components are chosen in such a way that the final dyestuffs have an adequate solubility in the dyeing liquor, that is to say, that the ultimate dyes contain at least two sulfo groups or at least one sulfo group and one carboxyl group. Dyestuffs of this kind are readily soluble under dyeing conditions, and they are equally sparingly soluble in cold water.

The novel trisazo dyes of the present invention are exceptionally suitable for the dyeing and printing of natural or synthetic fiber materials containing hydroxyl groups or nitrogen, particularly of cotton and regenerated cellulose, as well as wool, half-wool (a 1:1 mixture of wool and cellulose staple fiber), silk, polyamide, leather, and paper. The dyeing and printing can be effected in the customary ways to provide blue, green and black dyeings with good fastness properties, particularly to washing and perspiration. To the extent that

particularly —NH—, the dyes of the present invention normally need not be salted out of the solution in which they are prepared, and the mother liquors contain practically no dye. When dyeing in accordance with the extraction method using the dyes of the present invention, they also go extensively onto the fibers being dyed, so that an almost clear residual liquor is obtained. Because of their exceptional fastness, the dyes of the present invention are particularly suited for the dyeing of linings for clothing, whether such linings are made of cotton, regenerated cellulose or polyamide.

In the following examples the parts and percentages are by weight, and the temperatures are given in centigrade degrees.

EXAMPLE 1

To a 4-nitrodiazobenzene solution prepared at 0° C from 14.8 parts 1-amino-4-nitrobenzene, 30 parts 30% aqueous hydrochloric acid and a solution of 7.6 parts sodium nitrite in 30 parts water, is added at 0° C a solution adjusted with sodium carbonate to pH 6, of 31.9 parts 1-amino-8-hydroxynaphthalene-3,6-disulfonic acid in 100 parts water. The coupling is completed and to the resulting suspension of red monoazo dye is added a solution of tetrazo compound prepared by tetrazotizing 23.5 parts 2[4'-aminophenyl]-5-(or 6-)aminobenzimidazole with 14.6 parts sodium nitrite in a mixture of 50 parts 30% aqueous hydrochloric acid, 200 parts water and 50 parts ice. After the entire reaction mixture stands one-half hour it is brought to a pH value of 7.5 with 20% sodium carbonate solution cooled to 5° C.

The resulting unilateral coupling is completed in a few minutes, whereupon the reaction mixture is combined with a solution of 12 parts phenol in 10 parts 30% sodium hydroxide solution and 50 parts water, the final mixture is adjusted to a pH value of 9.5 with a 30% sodium hydroxide solution and stirred for 3 hours at this pH value and a temperature of 10° to 15° C. The trisazo dye thus formed is filtered off after the pH value is brought down to 7.5 with the aid of 30% aqueous hydrochloric acid and dried.

In a dye beaker fitted in a heatable water-bath, a solution of 0.2 parts sodium carbonate and 4 parts Glauber's salt in 200 parts water is prepared at 40° C. Then 0.2 parts of the dye thus prepared is added to form a homogeneous dye liquor into which is placed 10 g cotton fabric maintained in continuous motion. The temperature of the dye liquor is raised to 95° C and dyeing continues for 45 minutes at this temperature. The dye cotton fabric is thereupon removed from the residual liquor which is now very weakly dyed, and the liquor adhering to the removed fabric is squeezed out by wringing. Subsequently, the dyed material is washed with cold water and dried at 60° C. There is obtained a green dyeing with good fastness to washing and perspiration.

A dyeing on polyamide is obtained as follows: 0.2 parts of the dyestuff as prepared and 2 ml. of a 10% aqueous ammonium acetate solution are filled up in a dyeing apparatus with desalted water to give a volume of 250 ml. and then heated at 40° C. To this dye liquor there are introduced 10 g. Perlon fiber yarn which is dyed at 40° C. for 10 minutes. Subsequently, heating is done up to boiling temperature within 30 minutes and the material dyed at this temperature for another 90 minutes. When doing so, 1 ml. of a 3% acetic acid solution is added each time after 30 minutes. The whole is rinsed in cold water until the rinsing water remains clear and the resulting dyeing is dried.

Obtained is a green dyeing having good fastness properties in particular a good fastness to washing and perspiration.

EXAMPLE 2

23.8 parts 2-[4'-aminophenyl]-5- (or 6-) aminobenzimidazole are tetrazotized at 0° to 5° C in a mixture of 200 parts water and 50 parts 30% aqueous hydrochloric acid with the addition of ice, using a solution of 14.6 parts sodium nitrite solution, stirring is continued for 1 hour at 0° to 5° C. and excess nitrous acid is removed by adding a little amidosulfonic acid.

To the resulting solution of the tetrazo compound there is added in the course of 15 minutes a solution, cooled to 0° C. of 16.4 parts 2-hydroxybenzoic acid in 100 parts water and 9 parts 30% aqueous sodium hydroxide solution. Then with further addition of ice, a solution of 53 parts sodium carbonate in 250 parts water is added within 30 minutes to bring the pH to 10, and stirring proceeds for 2 hours at 0° to 5° C. The unilateral coupling that results is then completed and a neutral solution of 2-[2'-nitrophenylazo]-1-amino-8- hydroxynaphthalene-3,6-disulfonic acid is added, that solution having been prepared in advance as follows: A 2-nitrodiazobenzene solution prepared from 14.9 parts 2-nitroaniline, 50 parts 30% aqueous hydrochloric acid and 7.6 parts sodium nitrite, is combined at 0° C. with a suspension of 31.9 parts 1-amino-8-hydroxynaphthalene-3,6-disulfonic acid in 100 parts water and 15 parts 30% aqueous hydrochloric acid. Coupling is completed in a few minutes and the resulting suspension of red monoazo dye is neutralized with sodium carbonate, the dye largely dissolving to a blue color.

Upon addition of this blue solution to the above-prepared unilaterally coupled reaction mixture, and then stirring for 2 hours at 10° C the desired trisazo dye is formed and is filtered off after the product mixture is adjusted to a pH value of 7.5 with the aid of a 30% aqueous hydrochloric acid. The filtered and dried dyestuff dyes cotton and wool in green tints.

EXAMPLE 3

30 Parts 1-amino-8-hydroxynaphthalene-3,6-disulfonic acid are dissolved in 100 parts water by the addition of sodium carbonate in such a manner that the solution has a pH value of 6.5.

22.4 Parts 2-(4'-aminophenyl)-5- (or -6-) aminobenzimidazole are separately tetrazotized at 0° to 5° C in a composition of 200 parts water and 50 parts 30% aqueous hydrochloric acid and with the addition of ice, using a solution of 13.8 parts sodium nitrite in 50 parts water. After the addition of the sodium nitrite solution, stirring is effected for about 1 hour at 0° to 5° and then excess nitrous acid is removed with amidosulfonic acid. The previously prepared solution of the 1-amino-8-hydroxynaphthalene-3,6-disulfonic acid is thereafter added dropwise to the solution of the tetrazo material, the resulting mixture adjusted to pH 2 with 10% aqueous sodium carbonate solution, and unilateral coupling is completed by stirring the mixture at 10° to 15° C and adding 10% sodium carbonate solution to bring the pH value to 2.5.

To the resulting suspension of diazotized monoazo dye, ice is added to cool it to 0° to 5° C, and then there is added a diazobenzene solution, prepared in a known manner from 8.45 parts aniline, 25 parts 30% aqueous hydrochloric acid and a solution of 6.3 parts sodium nitrite in 20 parts water at 0° C, 10% aqueous sodium carbonate solution being then added to the diazobenzene solution to bring its pH value to 8.5 to 9.

To the suspension of the green diazotized disazo dye thus formed, there is added a solution of 10.3 parts 1,3-diamino-benzene in 100 parts water. Stirring is then carried out for 3 hours at 5° to 10° C, and with 30% hydrochloric acid the pH of the mixture is adjusted to 7.5, whereby the desired dye separates. It is filtered off and dried. When applied to cotton by the procedure of Example 1 it gives a jet black dyeing with good fastness properties, particularly with a good fastness to washing and perspiration.

EXAMPLE 4

The unilaterally coupled diazotized monoazo dye prepared as in Example 3 and still in its reaction mixture is mixed with a solution of 10.3 parts 1,3-diaminobenzene in 100 parts water, the pH value of the resulting mixture is raised with 10% aqueous sodiumcarbonate solution to 8.5 to 9, and stirring is effected for 1 hour for the completion of the coupling. To the disazo dye reaction mixture thus formed is added a diazobenzene solution prepared in a known manner from 8.45 parts aniline, 25 parts 30% aqueous hydrochloric acid and a solution of 6.3 parts sodium nitrite in 20 parts water at 0° C. The pH value of the entire mixture is adjusted with 10% aqueous sodium carbonate solution to 8.5 to 9 and stirring effected for several hours at this pH value. The final coupling is thereupon completed, and after adjusting the pH value of this reaction mixture to 7.5 with 30% aqueous hydrochloric acid, the desired trisazo dye is isolated and dried.

The product thus obtained is identical with the trisazo dyestuff obtained in Example 3.

In general suitable radicals A of diazo constituents A-NH$_2$ are phenyl-, α- or β-naphthyl, benzothiazolyl-(2), and dehydrothiotoluidinyl. These radicals may be unsubstituted or singly or multiply substituted by the following substituents, for example: Alkyl, alkoxy, or alkylthio, particularly with 1 to 4 carbon atoms each; hydroxy, cyano, nitro, sulfo, carboxy, halogen, particularly chlorine or bromine, alkoxy-carbonyl, particularly with 1 to 4 carbon atoms in the alkoxy radical; alkylcarbonyl particularly with 2 to 5 carbon atoms, such as acetyl or butyryl; aroyl, such as benzoyl; carboxylic acid amide or sulfonic acid amide, both of which may in turn be mono or disubstituted by alkyl with 1 to 4 carbon atoms; alkylamino, particularly with 1 to 4 carbon atoms in the alkyl radical; arylamino, particularly with 6 to 12 carbon atoms in the aryl radical, alkylcarbonylamino with 2 to 5 carbon atoms, particularly acetamino, or disubstituted by chloro and/or nitro and/or sulfo and/or alkyl with 1 to 2 carbon atoms or trisubstituted by chloro.

Radical A$^3$ may also in general be derived from customary dye coupling constituents A$^3$-H, particularly of the aromatic or heterocyclic series, which may also carry other substituents customary in dye chemistry. This radical may accordingly be any of the benzene or naphthalene series; radicals also including hydroxyphenyl, diaminophenyl, aminohydroxyphenyl, dihydroxyphenyl, hydroxynaphthyl, aminonaphthyl, aminohydroxynaphthyl and acetoacetic acid aryl amide radicals, as well as the following heterocyclic coupling radicals of the pyrazolone, 6-hydroxypyridone-(2), or 2,6-diamino pyridine series. Preferred aromatic radicals A$^3$ are α- or β-naphthyl, phenyl which are mono or disubstituted by amino and/or hydroxy, wherein an amino group may also be mono or disubstituted by alkyl, particularly with 1 to 4 carbon atoms, or monosubstituted by aryl, particularly with 6 to 12 carbon atoms, e.g. phenyl or tolyl, or by alkylcarbonyl, particularly with 2 to 5 carbon atoms, or disubstituted by aryl and alkyl or alkylcarbonyl and alkyl, wherein the aryl, alkyl and alkylcarbonyl groups may contain the number of carbon atoms particularly given above. Any of the foregoing amino groups may also be monosubstituted by carboxyalkyl or sulfoalkyl, particularly with 1 to 2 carbon atoms each in the alkyl radical, acetyl, phenyl, or tolyl or two methyl or ethyl substituents. Furthermore, radical A$^3$ may also contain the following substituents, for example: Alkyl, alkoxy, alkylthio, particularly with 1 to 4 carbon atoms each; hydroxy; cyano, nitro, sulfo, carboxy; halogen, particularly chlorine or bromine; alkoxycarbonyl, particularly with 1 to 4 carbon atoms in the alkoxy radical; alkylcarbonyl particularly with 2 to 5 carbon atoms, such as acetyl or butyryl, for example; aroyl, such as benzoyl.

The nucleus I of the heterocyclic diamine can, in particular, carry one or two methyl, chlorine or bromine substituents. The nucleus II of the heterocyclic diamine can, in particular, carry one or two substituents from the series; alkyl having 1 to 4 C atoms, alkoxy having 1 to 4 C atoms, chlorine or bromine.

Within the scope of the present invention, those dyestuffs are preferred in which A represents a radical of a diazo constituent of the naphthalene series, but particularly of the benzene series, it being possible for the naphthalene radical, but particularly the phenyl radical, also to be monosubstituted by nitro, chlorine, sulpho, carboxyl, alkyl having 1 to 4 carbon atoms, particularly 1 to 2 C atoms, alkoxy having 1 to 4 C atoms, particularly 1 to 2 C atoms, or alkylcarbonylamino having 2 to 5 C atoms, particularly acetamino, or to be distributed by chlorine and/or nitro and/or sulpho and/or alkyl having 1 to 2 C atoms, or to be trisubstituted by chlorine, $A^3$ represents a radical of a coupling constituent of the hydroxynaphthyl, aminonaphthyl or aminohydroxynaphthyl series, but particularly of the hydroxyphenyl, diaminophenyl, dihydroxyphenyl or aminohydroxyphenyl series, it being possible for the said radicals, in particular, of the coupling constituent of the phenyl series also to be additionally monosubstituted by alkyl having 1 to 4 C atoms, particularly 1 to 2 C atoms, alkoxy having 1 to 4 C atoms, particularly 1 to 2 C atoms, carboxyl, sulpho, chlorine or nitro, and for amino groups which may be present also to carry a sulphoethyl, sulphomoethyl, carboxyethyl, carboxymethyl, acetyl, phenyl or tolyl substituent or two methyl or ethyl substituents, and X represents the group —NH—.

In particular, the dyestuffs according to the invention can be present in the form of salts, particularly sodium salts.

The following tables list the structural synthesis of further dyes of Formula I which are prepared and used in accordance with the Examples. The various sulfo groups may in each instance be in free acid or salt form. Table I lists dyestuffs of the general Formula

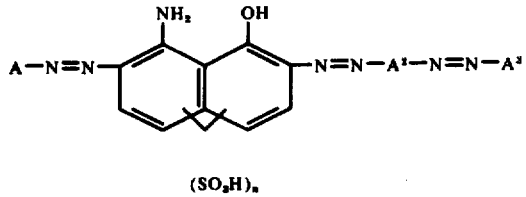

and table II lists dyestuffs of the general Formula

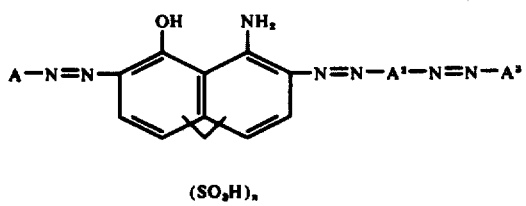

TABLE I

| Diazo constituent A—NH$_2$ | $A^1$ 1-Amino-8-hydroxy-naphthalene- | $A^2$ Heterocycle* X | | Coupling constituent $A^3$—H | Colors Cotton |
|---|---|---|---|---|---|
| 2-Chloraniline | 3,6-disulfonic acid | —NH—; | 5-amino | 2-methylphenol | green |
| 4-Nitroaniline | " | " | " | 1,3-diaminobenzol | black |
| 2,5-dichloraniline | " | " | " | Phenol | green |
| 2-chlor-4-nitroaniline | " | " | " | " | " |
| 2,5-dichloraniline | " | " | " | 1-amino-naphthalene-4-sulfonic acid | black |
| 4-aminobenzene sulfonic acid | " | " | " | 1-(2'-methylphenylamino)-3-hydroxy-benzene | black |
| 4-nitroaniline | " | " | " | 2-amino-8-hydroxy-naphthalene-6-sulfonic acid | black |
| 4-nitroaniline | " | " | " | 2-hydroxy-benzoic acid | green |
| 2,5-dichloraniline | " | " | " | 1-amino-8-hydroxy-naphthalene-3,6-disulfonic acid | blue |
| 4-chloraniline | " | CH$_3$<br>\|<br>—N— | " | Phenol | green |
| 3-aminobenzene-sulfonic acid | " | —NH— | " | 1-amino-3-hydroxy-benzene | black |
| 2,5-dichloraniline | " | " | " | 2-amino-8-hydroxy-naphthalene-6-sulfonic acid | blue |
| 2,5-dichloraniline | " | " | " | 2-amino-5-hydroxy-naphthalene-7-sulfonic acid | " |
| 4-nitroaniline | " | " | " | 2-hydroxy-3-methyl-benzoic acid | green |
| 2-chlor-4-nitroani- | " | " | " | 2-hydroxy-benzoic acid | " |
| 4-nitroaniline | " | CH$_3$<br>\|<br>—N— | " | Phenol | " |
| 4-nitroaniline | " | C$_2$H$_5$<br>\|<br>—N— | " | Phenol | " |
| 4-nitroaniline | " | C$_3$H$_7$<br>\|<br>—N— | " | Phenol | " |
| 4-nitroaniline | " | C$_4$H$_9$<br>\|<br>—N— | " | Phenol | " |
| 4-aminobenzene-sulfonic acid | " | C$_6$H$_5$<br>\|<br>—N— | " | Phenol | " |

TABLE I-continued

| Diazo constituent A—NH₂ | A¹ 1-Amino-8-hydroxy-naphthalene- | A² Heterocycle* X | | Coupling constituent A³—H | Colors Cotton |
|---|---|---|---|---|---|
| 2-aminobenzene-sulfonic acid | '' | CH₂—C₆H₅ <br> —N— | '' | 2-methyl-phenol | '' |
| 4-nitroaniline | '' | —NH—; 4-CH₃ | '' | Phenol | '' |
| 4-nitroaniline | '' | —NH—; 6-CH₃ | '' | Phenol | '' |
| 4-nitroaniline | '' | —NH—; 6-Cl | '' | 2-hydroxy-benzoic acid | '' |
| 2-nitroaniline | '' | —NH—, 7-Cl; | '' | 2-hydroxy-benzoic acid | '' |
| 4-nitroaniline | '' | —NH—, 6-OC₂H₅; | '' | Phenol | '' |
| 4-chloraniline | '' | —NH—, 2'-Cl; | '' | Phenol | '' |
| 2-chloraniline | '' | —NH—, 3'-Cl; | '' | Phenol | '' |
| 4-nitroaniline | '' | —NH—, 2'-CH₃; | '' | 2-hydroxy-benzoic acid | '' |
| 4-nitroaniline | '' | —NH—, 3'-CH₃; | '' | Phenol | '' |
| 2-nitroaniline | '' | —O— | '' | 2-hydroxy-benzene-sulfonic acid | '' |
| 4-nitroaniline | '' | —S— | '' | Phenol | '' |
| 4-aminobenzene-sulfonic acid | 4,6-disulfonic acid | —NH— | '' | Aceto-acetic acid anilide | '' |
| 3-amino-6-chlor-benzene-sulfonic acid | 4-sulfonic acid | '' | '' | 2-hydroxy-benzoic acid | '' |
| 2-chloraniline | 3,6-disulfonic acid | C₂H₅ <br> —N— | '' | '' | '' |
| 4-chloroaniline | '' | '' | '' | '' | '' |
| 4-chloraniline | | C₃H₇ <br> —N— | | | |
| 2-nitroaniline | '' | C₆H₅ <br> —N— | '' | '' | '' |
| 4-nitroaniline | 4,6-disulfonic acid | CH₂C₆H₅ <br> —N— | '' | '' | '' |
| 4-nitroaniline | '' | —NH—, 2'-Cl; | '' | 2-methylphenol | '' |
| 4-nitroaniline | '' | —NH—, 4-CH₃; | '' | Phenol | '' |
| 4-nitroaniline | 3,6-disulfonic acid | —S—, 6-CH₃; | '' | 2-hydroxy-benzoic acid | '' |
| 2-amino-benzene-sulfonic acid | '' | —O— | '' | Phenol | '' |
| 4-nitroaniline | '' | '' | '' | 2-hydroxy-benzoic acid | '' |
| 4-nitroaniline | '' | —S—, 6-CH₃; | '' | 1,3-dihydroxy-benzene | '' |
| 2-chloraniline | '' | '' | '' | 2-hydroxy-benzoic acid | '' |
| 2-chloraniline | '' | '' | '' | Phenol | '' |
| 4-amino-benzene-sulfonic acid | 4,6-disulfonic acid | —NH— | '' | Phenol | '' |
| 3-amino-6-chlor-benzene-sulfonic acid | 4-sulfonic acid | '' | '' | 2-hydroxy-benzene-sulfonic acid | '' |
| 4-nitroaniline | 3,6-disulfonic acid | CH₃ <br> —N—; | 6-amino | Phenol | '' |
| 4-nitroaniline | '' | —O— | '' | 2-hydroxy-benzoic acid | '' |
| 2-chloraniline | '' | —S— | '' | Phenol | '' |
| 4-amino-benzene-sulfonic acid | 4,6-disulfonic acid | —O— | '' | Phenol | '' |
| 2-amino-benzene-sulfonic acid | 4-sulfonic acid | —S—, 5-CH₃; | '' | 2-hydroxy-benzoic acid | '' |
| 4-amino-benzene-sulfonic acid | 3,6-disulfonic acid | —S—, 5-Cl; | '' | '' | '' |
| 4-nitroaniline | '' | —O— | '' | 2-hydroxy-benzene-sulfonic acid | '' |
| 4-nitroaniline | '' | —S— | '' | Phenol | '' |
| 2-nitroaniline | '' | —S—, 5-CH₃; | '' | 2-hydroxy-benzoic acid | '' |
| 4-amino-benzene-sulfonic acid | '' | —S—, 5-Cl; | '' | Phenol | '' |
| 3-amino-benzene-sulfonic acid | 4,6-disulfonic acid | —O— | '' | 2-hydroxy-benzoic acid | '' |
| 4-amino-benzene-sulfonic acid | 4-sulfonic acid | —S— | '' | '' | '' |

*Substitutions are indicated by the following numbering:

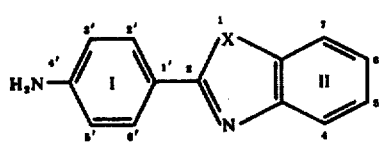

TABLE II

| Diazo constituent A—NH₂ | A¹ 1-amino-8-hydroxy-naphthalene- | A² Heterocycle* X | | Coupling constituent A³—H | Color tone on cotton |
|---|---|---|---|---|---|
| Aniline | 3,6-disulfonic acid | —NH— | 5-amino | Phenol | green |
| Aniline | '' | '' | '' | 1,3-dihydroxy-benzene | black |

TABLE II-continued

| Diazo constituent A—NH₂ | A¹ 1-amino-8-hydroxy-naphthalene- | A² Heterocycle* X | Coupling constituent A³—H | Color tone on cotton |
|---|---|---|---|---|
| Aniline | " | " | 1-amino-3-hydroxy-benzene | " |
| Aniline | " | " | 1-amino-3-hydroxy-4-chlor-benzene | " |
| Aniline | " | " | 1,3-diamino-4-methyl-benzene | " |
| Aniline | " | " | 1,3-diamino-4-methoxy-benzene | " |
| Aniline | " | " | 1,3-diamino-4-chlor-benzene | " |
| Aniline | " | " | 1,3-diamino-4-nitro-benzene | " |
| Aniline | " | " | 1-amino-3-carboxy-methylamino-benzene | " |
| 3-amino-benzene-sulfonic acid | " | " | 1-amino-3-hydroxy-benzene | " |
| 4-amino-benzene-sulfonic acid | " | " | 1-(2'-Methyl-phenyl-amino)-3-hydroxy-benzene | " |
| 4-amino-benzene-sulfonic acid | " | " | 2,4-dihydroxy-quinoline | " |
| 4-aminotoluene | " | " | 1,3-diamino-benzene-4-sulfonic acid | " |
| 2-amino-anisol | " | " | 1-amino-3-carboxy-ethylamino-benzene | " |
| 4-amino-ethylbenzene | " | " | 1-amino-3-dimethyl-amino-benzene | " |
| 2,5-dimethyl-aniline | " | " | 2-methyl-phenol | " |
| N-acetyl-1,4-di-amino-benzene | " | " | 1-phenylamino-3-hydroxy-benzene | " |
| 4-amino-benzene-sulfonic acid | " | " | 1-acetylamino-3-diethylamino-benzene | " |
| 2,5-dichloraniline | " | " | 2-hydroxy-benzoic acid | green |
| 1-amino-naphthalene | " | " | 2-hydroxy-benzene-sulfonic acid | " |
| 3-aminotoluene | " | " | aceto-acetic acid anilide | " |
| Aniline | " | " | 2-hydroxy-naphthalene-6-sulfonic acid | blue |
| Aniline | " | " | 1-amino-naphthalene-5-sulfonic acid | black |
| Aniline | " | —N(CH₃)— | " | 1,3-diamino-benzene | " |
| Aniline | " | —N(C₂H₅)— | " | Phenol | green |
| Aniline | " | —N(C₃H₇)— | " | 1,3-diamino-benzene | black |
| Aniline | " | —N(C₄H₉)— | " | Phenol | green |
| 2-amino-benzoic acid | " | —N(C₆H₅)— | " | 1,3-diamino-4-methyl-benzene | black |
| 2-amino-benzene-sulfonic acid | " | —N(CH₂—C₆H₅)— | " | 1,3-diamino-benzene | " |
| Aniline | " | —NH—, 4-CH₃ | " | " | " |
| Aniline | " | —NH—, 6-CH₃ | " | Phenol | green |
| Aniline | " | —NH—, 6-Cl | " | 1,3-diamino-benzene | black |
| Aniline | " | —NH—, 7-Cl | " | Phenol | green |
| Aniline | " | —NH—, 6-OC₂H₅ | " | 1,3-diamino-benzene | black |
| Aniline | " | —NH—, 2'-CH₃ | " | Phenol | green |
| Aniline | " | —NH—, 3'-CH₃ | " | 1,3-diamino-benzene | black |
| Aniline | " | —NH—, 2'-Cl | " | Phenol | green |
| Aniline | " | —NH—, 3'-Cl | " | 1,3-diamino-benzene | black |
| Aniline | " | —O— | " | " | " |
| Aniline | " | —S— | " | Phenol | green |
| Aniline | " | —S—, 6-CH₃ | " | 1,3-diamino-benzene | black |
| Aniline | " | " | " | Phenol | green |
| 3-amino-benzene-sulfonic acid | " | " | " | 1-amino-3-hydroxy-benzene | black |
| Aniline | 4,6-disulfonic acid | —NH— | " | Phenol | green |
| 1-amino-2-chlor-benzene | " | " | " | 1,3-diamino-benzene | black |
| 3-amino-benzene-sulfonic acid | 4-sulfonic acid | " | " | " | " |
| Aniline | " | " | " | 1-amino-3-sulfo-ethyl-amino-benzene | " |
| 1-amino-naphthalene-4-sulfonic acid | " | " | " | 1,3-diamino-benzene | " |
| Aniline | 3,6-disulfonic acid | —N(CH₃)— | 6-amino | " | " |
| Aniline | " | —O— | " | Phenol | green |
| 4-nitro-aniline | " | " | " | 1,3-diamino-benzene | black |
| Aniline | " | —S— | " | Phenol | green |
| Dehydrothiotoluid- | " | " | " | 1,3-diamino-benzene | black |

TABLE II-continued

| Diazo constituent A—NH₂ | A¹ 1-amino-8-hydroxy-naphthalene- | A² Heterocycle* X | Coupling constituent A³—H | Color tone on cotton |
|---|---|---|---|---|
| ine-sulfonic acid | | | | |
| Aniline | " | —S—, 5-CH₃ | " | " |
| Aniline | " | —S—, 5-Cl | " | " |
| Aniline | 4,6-disulfonic acid | —S— | " | " |
| 2-amino-5-nitro-benzene-sulfonic acid | 4-sulfonic acid | —O— | 1-amino-3-carboxy-methylamino-4-methyl-benzene | " |

*Substitutions are indicated by the following numbering:

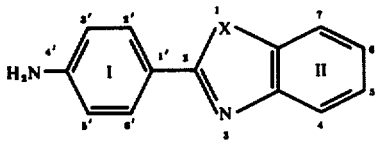

Obviously, many modifications and variations of the present invention are possible in the light of the above teachings. It is, therefore, to be understood that within the scope of the appended claims the invention may be practiced otherwise than as specifically described.

What is claimed:

1. A water-soluble dye having the formula

A-N=N-A¹-N=N-A²-N=N-A³ where A¹ is selected from the class consisting of

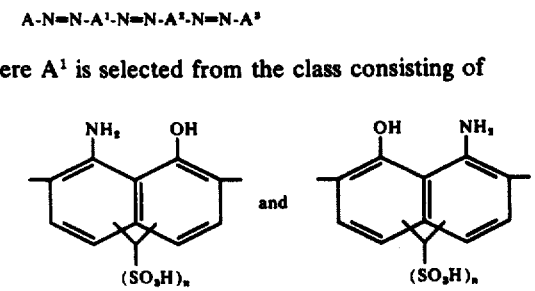

$n$ being 1 or 2,
A² is selected from the class consisting of

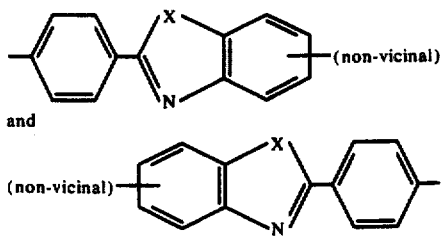

X being

—S—, or —O—and
R being hydrogen or lower hydrocarbyl free of non-aromatic unsaturation,
A is a radical of a diazo component, and
A³ is a radical of a coupling component,
each of A and A³ having a carbon-containing aromatic ring connected by such carbon to the azo linkages.

2. A dye of claim 1 in which A is selected from the class consisting of unsubstituted or substituted phenyl, naphthyl and dehydrothiotoluidinyl, the substitution being selected from the class consisting of:
alkyl having 1 to 4 carbon atoms,
alkoxy having 1 to 4 carbon atoms,
alkylthino having 1 to 4 carbon atoms,
hydroxy,
cyano,
nitro,
sulfo,
carboxy,
chloro,
bromo,
alkoxycarbonyl having 1 to 4 carbon atoms in the alkoxy radical,
alkylcarbonyl having 2 to 5 carbon atoms,
aminocarbonyl,
alkylaminocarbonyl having 1 to 4 carbon atoms in the alkyl radical,
alkylamino having 1 to 4 carbon atoms in the alkyl radical,
arylamino having 6 to 12 carbon atoms,
alkylcarbonylamino having 2 to 5 carbon atoms,
aminosulfonyl, and
alkylaminosulfonyl having 1 to 4 carbon atoms in the alkyl radical.

3. A dye of claim 1, in which A is selected from the class consisting of unsubstituted and substituted phenyl and naphthyl, the substitution being selected from the class consisting of:
nitro,
chloro,
sulfo,
carboxy,
alkyl having 1 to 4 carbon atoms,
alkoxy having 1 to 4 carbon atoms, and
alkylcarbonylamino having 2 to 5 carbon atoms.

4. A dye of claim 1 wherein —X— is

5. A dye of claim 1 in which A³ is selected from the class consisting of phenyl and naphthyl mono- or di-substituted with hydroxy or with unsubstituted, or mono- or di-substituted amino, the amino substitution being selected from the class consisting of:
monoalkyl,
dialkyl,
monoaryl monoalkylcarbonyl having 2 to 5 carbon atoms,
N-aryl-N-alkyl
N-alkylcarbonyl-N-alkyl,
carboxy-N-alkyl,
sulfo-N-alkyl,
said phenyl or naphthyl having no further substitution, or being further substituted by
alkyl,
alkoxy,
alkylthio,
cyano,
nitro,
sulfo,
carboxy,
halogen,
alkoxycarbonyl,
alkylcarbonyl having 2 to 5 carbon atoms,
each alkyl and alkoxy having up to 4 carbon atoms, and each aryl 6 to 12 carbon atoms.

6. A dye of claim 1 in which
A is selected from the class consisting of unsubstituted and substituted phenyl and naphthyl, the substitution being with one nitro, chloro, sulfo, carboxyl, alkyl having up to 4 carbon atoms, alkoxy having up to 4 carbon atoms, alkylcarbonyl having 2 to 5 carbon atoms, or being with two substituents selected from the class consisting of chlorine, nitro, sulfo and alkyl having up to 4 carbon atoms, or being tri-substituted with chlorine, $A^2$ is selected from the class consisting of hydroxynaphthyl, aminonaphthyl, aminohydroxynaphthyl, hydroxyphenyl, diaminophenyl, dihydroxyphenyl and aminohydroxyphenyl, and mono-substituted derivatives thereof in which the further substitution is selected from the class consisting of alkyl having up to 4 carbon atoms, alkoxy having up to 4 carbon atoms, carboxy, sulfo, chlorine, and nitro, and in the case of the amino groups the further substitution is selected from the class consisting of a sulfoethyl, sulfomethyl, carboxyethyl, carboxymethyl, acetyl, phenyl and tolyl, and the substitution by two methyls or ethyls, and X is $$-\overset{H}{\underset{}{N}}-.$$

7. A water-soluble dye having the formula

A-N=N-A¹-N=N-A²-N=N-A³ where A¹ is selected from the class consisting of

[structures with NH₂, OH, (SO₃H)ₙ]

and $n$ being 1 or 2,
A² is selected from the class consisting of

[structure with X, (non-vicinal)]

and

[structure with X, (non-vicinal)]

X being $$-\overset{R}{\underset{}{N}}-,$$

—S—, or —O—, and
R being hydrogen or lower hydrocarbyl free of non-aromatic unsaturation,
A is selected from the class consisting of unsubstituted or substituted phenyl, naphthyl and dehydrothiotoluidinyl, the substitution being selected from the class consisting of:
alky having 1 to 4 carbon atoms,
alkoxy having 1 to 4 carbon atoms,
alkylthio having 1 to 4 carbon atoms,
hydroxy,
cyano, nitro,
sulfo,
carboxy,
chloro,
bromo,
alkoxycarbonyl having 1 to 4 carbon atoms in the alkoxy radical,
alkylcarbonyl having 2 to 5 carbon atoms,
aminocarbonyl,
alkylaminocarbonyl having to 1 to 4 carbon atoms in the alkyl radical,
alkylamino having 1 to 4 carbon atoms in the alkyl radical,
arylamino having 6 to 12 carbon atoms,
alkylcarbonylamino having 2 to 5 carbon atoms,
aminosulfonyl, and
alkylaminosulfonyl having 1 to 4 carbon atoms in the alkyl radical, and
$A^3$ is acetoacetic acid arylamide.

8. The dye of claim 1 having the formula

[structure]

9. The dye of claim 1 having the formula

[structure]

-continued
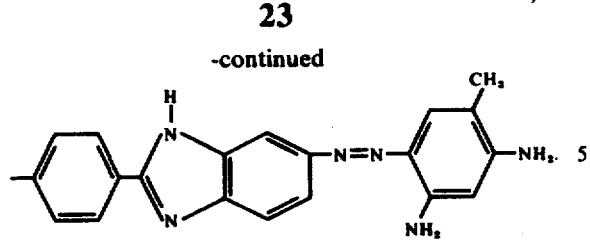
10. The dye of claim 1 having the formula
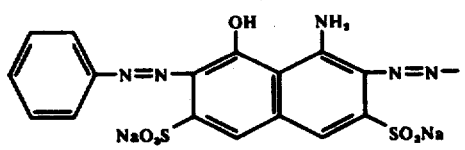
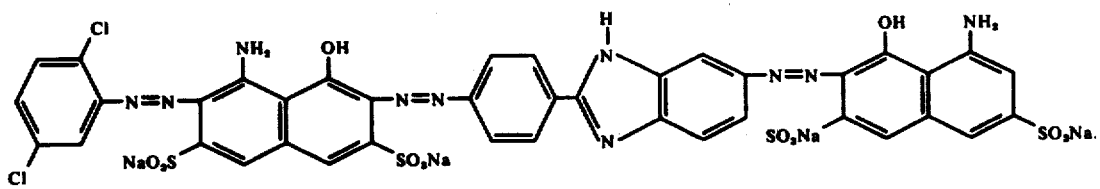
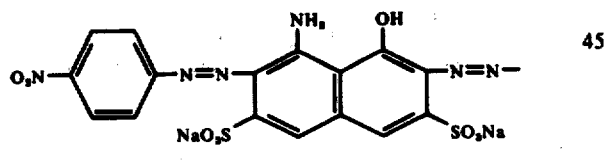
11. The dye of claim 1 having the formula
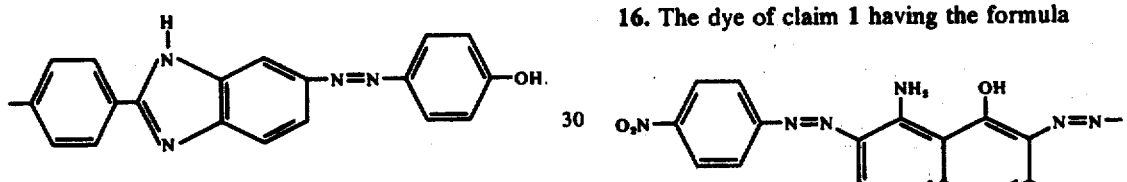
12. The dye of claim 1 having the formula
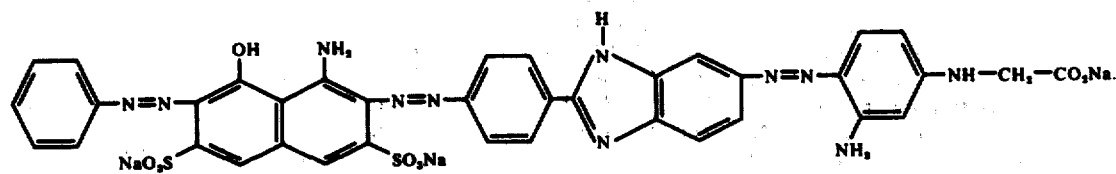
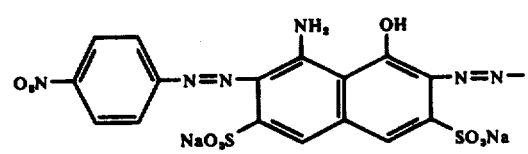
13. The dye of claim 1 having the formula
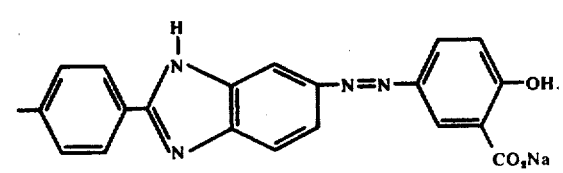
14. The dye of claim 1 having the formula
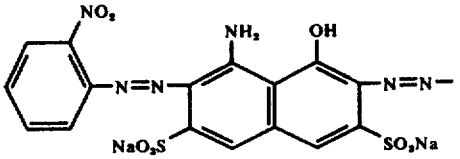
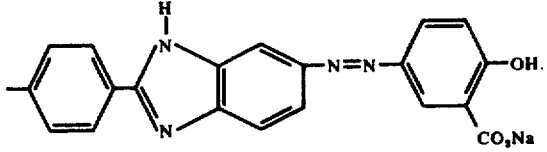
15. The dye of claim 1 having the formula
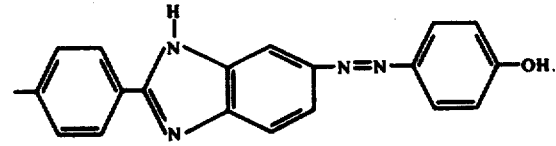
16. The dye of claim 1 having the formula
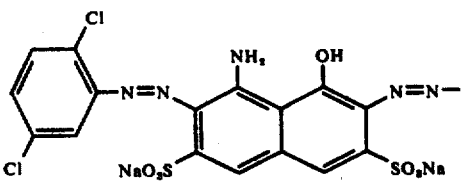
17. The dye of claim 1 having the formula
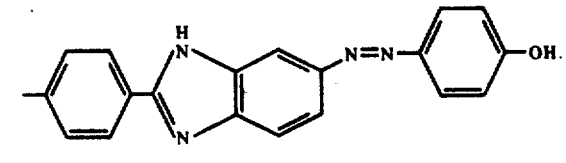

18. The dye of claim 1 having the formula
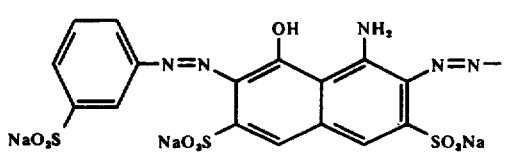
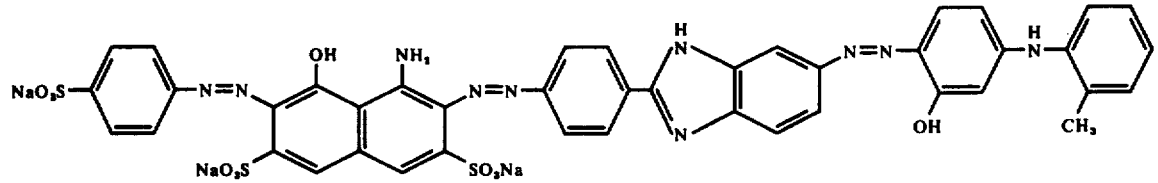
-continued
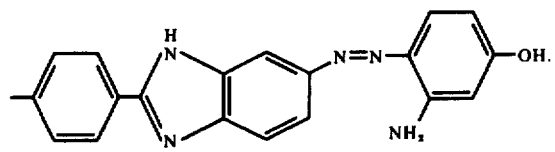
19. The dye of claim 1 having the formula
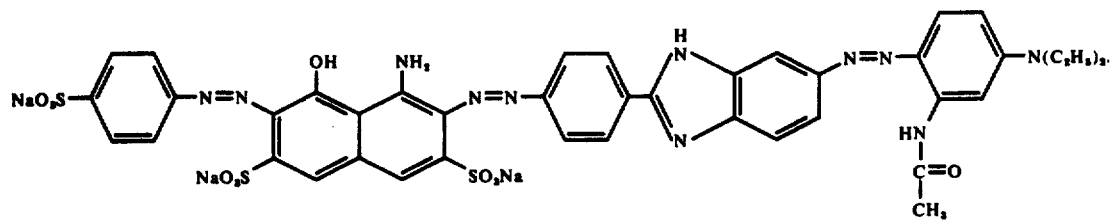
20. The dye of claim 1 having the formula
* * * * *